(12) United States Patent
Hwang et al.

(10) Patent No.: US 10,691,206 B2
(45) Date of Patent: Jun. 23, 2020

(54) PRESSURE-SENSITIVE HAPTIC DEVICE

(71) Applicant: LG ELECTRONICS INC., Seoul (KR)

(72) Inventors: Hyokune Hwang, Seoul (KR); Sooyong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 15/753,683

(22) PCT Filed: Dec. 10, 2015

(86) PCT No.: PCT/KR2015/013511
§ 371 (c)(1),
(2) Date: Feb. 20, 2018

(87) PCT Pub. No.: WO2017/030248
PCT Pub. Date: Feb. 23, 2017

(65) Prior Publication Data
US 2018/0239432 A1  Aug. 23, 2018

(30) Foreign Application Priority Data

Aug. 17, 2015 (KR) ........................ 10-2015-0115652

(51) Int. Cl.
*G06F 3/01* (2006.01)
*G06F 3/041* (2006.01)
*G06F 3/0488* (2013.01)

(52) U.S. Cl.
CPC ............ *G06F 3/016* (2013.01); *G06F 3/0414* (2013.01); *G06F 3/04886* (2013.01); *G06F 2203/014* (2013.01)

(58) Field of Classification Search
None
See application file for complete search history.

(56) References Cited

U.S. PATENT DOCUMENTS

| 4,675,569 A * | 6/1987 | Bowman ............... G06F 3/0414 |
| | | 178/18.01 |
| 8,169,416 B2 * | 5/2012 | Han ..................... G06F 3/044 |
| | | 345/173 |
| 2006/0274508 A1 * | 12/2006 | LaRiviere ............ H05K 7/1488 |
| | | 361/727 |
| 2007/0001830 A1 | 1/2007 | Dagci et al. |

(Continued)

FOREIGN PATENT DOCUMENTS

| EP | 2811374 A1 | 12/2014 |
| KR | 10-2007-0071345 A | 7/2007 |
| KR | 10-2012-0015764 A | 2/2012 |

*Primary Examiner* — Matthew Yeung
(74) *Attorney, Agent, or Firm* — Birch, Stewart, Kolasch & Birch, LLP

(57) ABSTRACT

The present invention provides a pressure-sensitive haptic device comprising: a support plate onto one surface of which a touch screen is coupled; an actuator, coupled to the support plate, for generating vibration in response to a load applied to the touch screen and delivering the vibration to the support plate; a guide rail part, disposed in contact with the other surface of the support plate, for supporting the support plate; and a load sensing part coupled to both ends of the guide rail part, for detecting the size of the load which has been applied to the touch screen and delivered, via the guide rail part, to the load sensing part.

4 Claims, 22 Drawing Sheets

(56) References Cited

U.S. PATENT DOCUMENTS

| | | | |
|---|---|---|---|
| 2008/0084384 A1* | 4/2008 | Gregorio | G06F 3/016 |
| | | | 345/156 |
| 2010/0045612 A1* | 2/2010 | Molne | G06F 1/1626 |
| | | | 345/173 |
| 2011/0018695 A1 | 1/2011 | Bells et al. | |
| 2012/0038470 A1 | 2/2012 | Kim et al. | |
| 2012/0262403 A1* | 10/2012 | Tissot | B60K 35/00 |
| | | | 345/173 |
| 2014/0176462 A1 | 6/2014 | Ponziani | |
| 2015/0137938 A1* | 5/2015 | Slaby | G07C 9/00079 |
| | | | 340/5.53 |

\* cited by examiner (a)

(b)

(a)

(b)

(a)

(b)

US 10,691,206 B2

PRESSURE-SENSITIVE HAPTIC DEVICE

CROSS REFERENCE TO RELATED APPLICATIONS

This application is the National Phase of PCT/KR2015/013511 filed on Dec. 10, 2015, which claims priority under 35 U.S.C. § 119(a) to Patent Application No. 10-2015-0115652 filed in Republic of Korea on Aug. 17, 2015, all of which are hereby expressly incorporated by reference into the present application.

TECHNICAL FIELD

The present invention relates to a pressure-sensitive haptic device having a cantilever type load sensor.

BACKGROUND ART

Generally, haptics refers to a technology applied to an input device such as a touch screen to generate vibration, movement feeling, force, etc. in response to a reaction based on a user input or a specific condition, to provide various tactile senses to a user.

In particular, a touch screen using the haptic technology advantageously provides various types of user experience (UX) to users.

Recently, a technique for providing an effect of a physical button operating only when a specific load is applied through a touch screen has been introduced. Such a technique may include a touch screen employing the haptic technology and a pressure sensor and may be implemented by sensing a magnitude of a load applied to the touch screen through the pressure sensor, for example.

Meanwhile, as an application range of the touch screen employing the haptic technology is diversified, development of a pressure-sensitive haptic device capable of stably operating a function in an external environment for example, even under specific conditions such as vibration, temperature, and the like, may be considered.

DISCLOSURE OF THE INVENTION

Therefore, an object of the present invention is to provide a pressure-sensitive haptic device that stably implements a function even in an environment where vibrations or a temperature is changed.

To achieve these and other advantages and in accordance with the purpose of the present invention, as embodied and broadly described herein, there is provided a pressure-sensitive haptic device including: a support plate coupled in a state that a touch screen is mounted on one surface; an actuator coupled to the support plate, generating vibration in response to a load applied to the touch screen, and transmitting the vibration to the support plate; a guide rail part disposed to be in contact with the other surface of the support plate to support the support plate; and a load sensing part coupled to both ends of the guide rail part and sensing a magnitude of a load applied to the touch screen upon receiving the load through the guide rail part.

According to an example related to the present invention, the pressure-sensitive haptic device may further include: a spring part formed to provide an elastic force toward the support plate and press the guide rail part to prevent generation of a gap between the support plate and the guide rail part.

According to another example related to the present invention, the support plate may be coupled to the guide rail part and coupled to slidably move in one direction along the guide rail part, and the actuator may generate vibration in a direction in which the support plate slidably moves.

The guide rail part may include first and second guide rails disposed to face each other based on the actuator, and the load sensing part may be coupled to both ends of each of the first and second guide rails.

According to another example related to the present invention, the support plate may have a protrusion formed to protrude toward the actuator, and the actuator may include a fastening part coupled to the protrusion to prevent generation of a reaction force against a load applied to the touch screen in a portion where the support plate and the actuator are coupled, and the fastening part may include a damper part formed to slidably move in a state that at least a portion of the protrusion is inserted when a load is generated in the touch screen and a head part in which one end is coupled to the protrusion and at least a portion of the other end is caught by the damper part to limit movement based on an external force generated in a direction opposite to the load.

According to another example related to the present invention, the pressure-sensitive haptic device may further include: a controller calculating, when a load is generated in the touch screen, a center position of the load and a total load value of the load using each load magnitude measured by the load sensing part, and calculating each load magnitude acting by load generation positions by using the center position of the load and the total load value of the load.

To achieve these and other advantages and in accordance with the purpose of the present invention, as embodied and broadly described herein, there is provided a pressure-sensitive haptic device including: a support plate coupled in a state that a touch screen is mounted on one surface; an actuator coupled to the support plate, generating vibration in response to a load applied to the touch screen, and transmitting the vibration to the support plate; a guide part protruding from a side surface of the touch screen; and a load sensing part coupled to an end of the guide part and sensing a magnitude of the load upon receiving the load applied to the touch screen through the guide part.

The pressure-sensitive haptic device may further include: a bearing part formed to surround the guide part and disposed between the guide part and the load sensing part to support the guide part.

To achieve these and other advantages and in accordance with the purpose of the present invention, as embodied and broadly described herein, there is provided a pressure-sensitive haptic device including: a touch screen having a front surface and a rear surface; and a load sensing part coupled to the rear surface and sensing a magnitude of a load applied to the touch screen.

The pressure-sensitive haptic device may further include: an actuator coupled to the rear surface, generating corresponding vibration upon receiving a signal generated in the load sensing part, and transmitting the vibration to the touch screen.

The actuator may generate the vibration in a direction perpendicular to the front surface and the rear surface.

The pressure-sensitive haptic device may further include: a controller processing each function according to a load applied to the touch screen by using a signal generated in the load sensing part.

The controller may process a first function to correspond to a magnitude of a load applied to a first region of the touch screen and the first function may be a function of increasing or decreasing a size of screen information output on the touch screen.

In a state that a user's touch input is applied to the first region of the touch screen and a second region different from the first region, the controller may process a second function to correspond to a magnitude of a load applied to the first and second regions, and the second function may be a function of increasing or decreasing a size of screen information output on the touch screen according to a difference in load applied to the first and second regions.

The controller may process a third function to correspond to a magnitude of a load applied to the first region of the touch screen, and the third function may be a function of outputting each additional information provided based on screen information displayed on the touch screen.

A graphic object for receiving touch input information from a user may be output on the touch screen, and the controller may process a fourth function to correspond to a magnitude of a load applied to the graphic object.

The graphic object may be configured in the form of a wheel key, and the fourth function may be a function of performing each control function to correspond to a magnitude of a load applied to the wheel key.

The graphic object may include a first portion and a second portion different from the first portion, and the fourth function may be a function of selecting a specific control function by a user's touch input applied to the first portion and selecting a control value of a function selected by the user's touch input applied to the first portion, by a user's touch input applied to the second portion.

The pressure-sensitive haptic device may further include: a controller processing each function according to a load applied to the touch screen by using a signal generated in the load sensing part, wherein the pressure-sensitive haptic device may be mounted in a moving unit which is formed to be movable, and when a speed of the moving unit generating vibration in the pressure-sensitive haptic device is a first speed, the controller may control the actuator to generate first vibration, and when the speed of the moving unit is a second speed lower than the first speed, the controller may control the actuator to generate second vibration having a magnitude smaller than that of the first vibration.

The controller may increase sensitivity of a load sensed by the load sensing part when the speed of the moving unit is the first speed, and decrease sensitivity of the load sensed by the load sensing part when the speed of the moving unit is the second speed.

The pressure-sensitive haptic device may further include: a controller processing each function according to a load applied to the touch screen by using a signal generated in the load sensing part, wherein the pressure-sensitive haptic device may be mounted in a moving unit which is formed to be movable, and the controller may control a magnitude of vibration generated in the actuator according to a route state of the moving unit generating vibration in the pressure-sensitive haptic device.

The pressure-sensitive haptic device may further include: a controller processing each function according to a load applied to the touch screen by using a signal generated in the load sensing part, wherein the controller may determine any one of both hands of the user based on a fingerprint form of the user applied to the touch screen, and when a touch is applied to the touch screen through any one hand, the controller may maintain vibration generated in the actuator, and when a touch input is applied to the touch screen through the other hand, the controller may stop the vibration generated in the actuator.

According to the pressure-sensitive haptic device of the present invention, since the support plate to which the touch screen is fixed is stably supported by the guide rail part disposed on the other surface and has high rigidity against a load applied to the touch screen, the haptic function according to the load applied to the touch screen may be stably provided without malfunction even in an environment where vibration or an external impact occurs.

Further, since the present invention is provided with a spring part formed to press the guide rail part to stably maintain a state in which the support plate and the guide rail part are tightly attached, reliability of a load value measured by the load sensing part coupled to both end portions of the guide rail part may be increased.

Furthermore, in the present invention, since a reaction force generated in a region where the support plate and the actuator are coupled when a load is generated on the touch screen is minimized by the protrusion part and the fastening part which couple the support plate and the actuator, an unnecessary factor affecting a load value measured by the load sensing part may be eliminated.

MODES FOR CARRYING OUT THE PREFERRED EMBODIMENTS

Figure 1A:
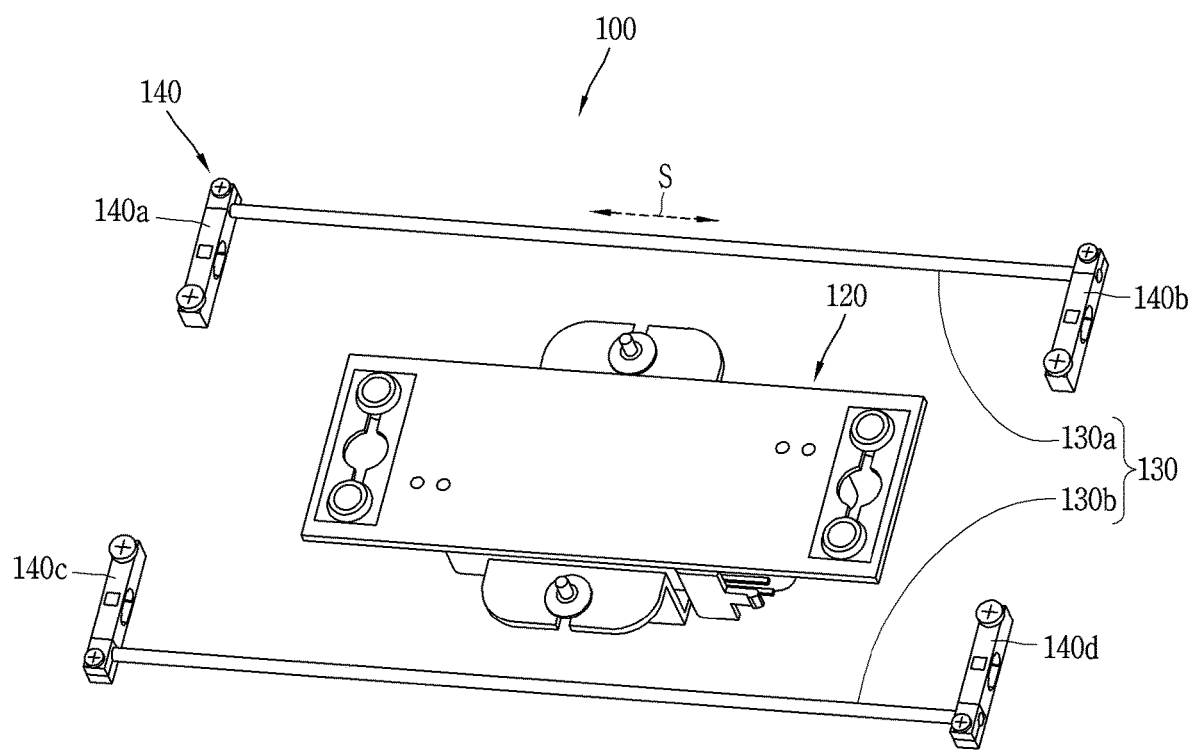
FIGS. 1A and 1B are perspective views illustrating a pressure-sensitive haptic device according to an embodiment of the present invention.

Hereinafter, a pressure-sensitive haptic device of the present invention will be described in detail with reference to the accompanying drawings. In the present specification, the same or similar components are denoted by the same or similar reference numerals in different embodiments, and a description thereof is replaced with a first description. As used herein, the singular forms "a", "an" and "the" include plural referents unless the context clearly dictates otherwise.

Figure 1B:
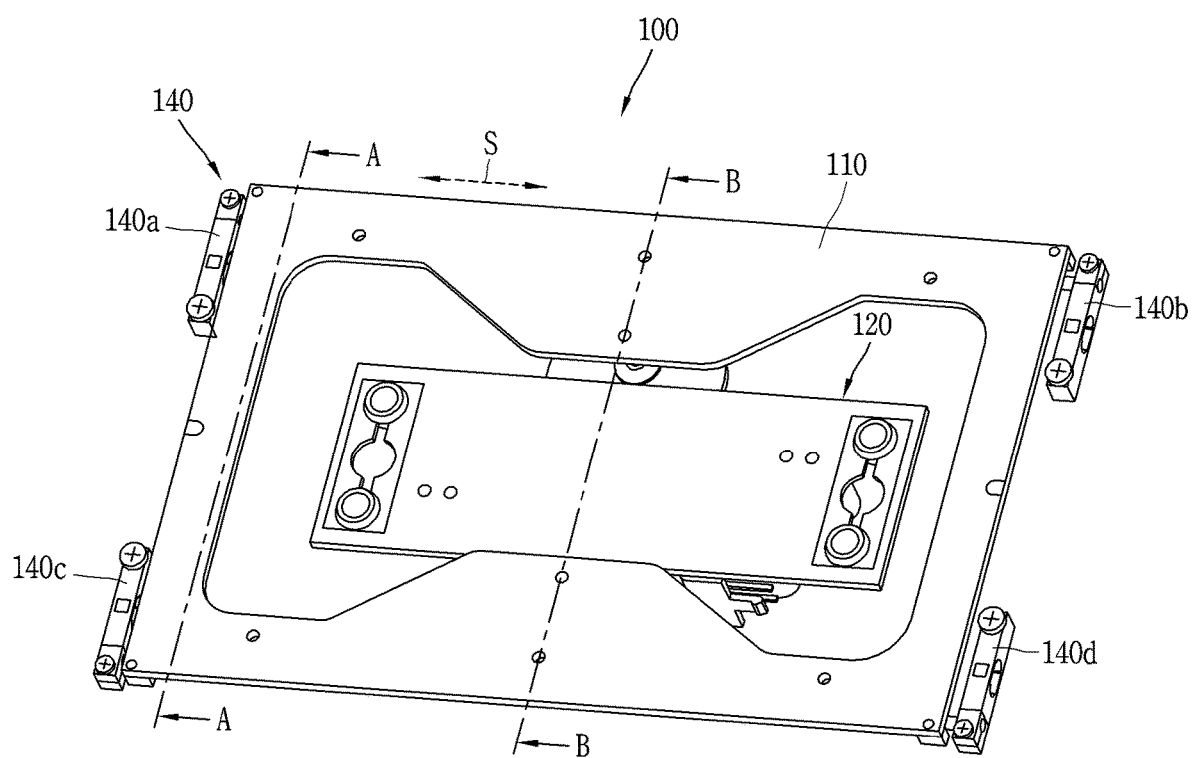

FIGS. 1A and 1B are perspective views illustrating a pressure-sensitive haptic device 100 according to an embodiment of the present invention.

Referring to FIGS. 1A and 1B, a pressure-sensitive haptic device 100 includes a support plate 110, an actuator 120, a guide rail part 130, and a load sensing part 140.

The support plate 110 is coupled with a touch screen (not shown) mounted on one surface thereof to fix the touch screen. The touch screen may include a touch panel sensing a touch input of a user. The touch input may receive information through a user's finger, a touch pen, or the like.

The actuator 120 is coupled to at least a portion of the support plate 110 and is configured to generate vibration in response to a load applied to the touch screen. Here, the actuator 120 transmits the vibration to the support plate 110 through the portion coupled with the support plate 110, and the vibration transmitted thusly provides various tactile sensations to the user through the touch screen disposed on the support plate 110.

The guide rail part 130 is arranged to be in contact with the other surface of the support plate 110 to support the support plate 110. For example, the guide rail part 130 may be formed in the form of a rod as illustrated. In FIGS. 1A and 1B, the guide rail part 130 has a circular cross-section but may have a polygonal cross-section, not the circular cross-section.

The guide rail part 130 may include first and second guide rails 130a and 130b.

The first and second guide rails 130a and 130b may be arranged to face each other with respect to the actuator 120 positioned at the center of the pressure-sensitive haptic device 100 as illustrated. Accordingly, the support plate 110 may be more stably supported by the first and second guide rails 130a and 130b.

Meanwhile, the support plate 110 may be coupled to the guide rail part 130 and may be slidably coupled along the guide rail part 130 in one direction, and the actuator 120 may be configured to generate vibration in a direction S in which the slide member 110 slides. That is, the movement direction S of the support plate 110 slidably engaged with the guide rail part 130 is matched with a vibration direction of the actuator 120 to strengthen the support structure of the support plate 110 and vibration generated in the actuator 120 may be transmitted to the user stably without any disturbing factor.

The load sensing part 140 is coupled to both ends of the guide rail part 130 to sense a magnitude of a load applied to the touch screen. Here, the load sensing part 140 receives the load applied to the touch screen through the guide rail part 130 supporting the support plate 110 and measures the magnitude of the load. Also, as illustrated, the load sensing part 140 may have first to fourth load sensors 140a, 140b, 140c, and 140d disposed at both ends of the first and second guide rails 130a and 130b.

In the meantime, the pressure-sensitive haptic device 100 may further include an acceleration sensing part (not shown). The acceleration sensing part may be configured to remove a load fluctuation due to vibration generated in an environment in which the pressure-sensitive haptic device 110 is installed.

According to the pressure-sensitive haptic device of the present invention described above, since the support plate 110 to which the touch screen is fixed is stably supported by at least one guide rail part 130 disposed on the other surface of the support plate 110 and both the support plate 110 and the guide rail part 130 are made of a rigid material, they can have a high rigidity with respect to a load applied to the touch screen. As a result, the pressure-sensitive haptic device 100 of the present invention is capable of providing a haptic function according to a load applied to the touch screen without malfunction even in an environment in which vibration or an external impact occurs, for example, even in a moving unit such as a vehicle or an airplane.

Hereinafter, the load sensing part 140 included in the pressure-sensitive haptic device 100 of the present invention will be described with reference to FIGS. 2A to 3.

Figure 2A:
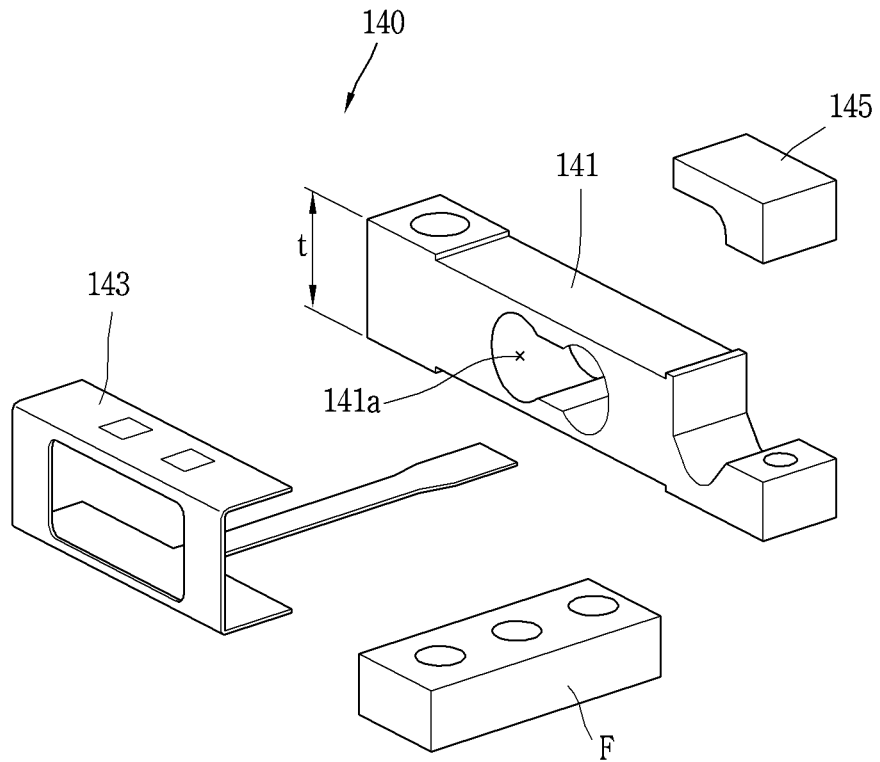
FIG. 2A is a perspective view illustrating a disassembled state of a load sensing part illustrated in FIG. 1A.
Figure 2B:
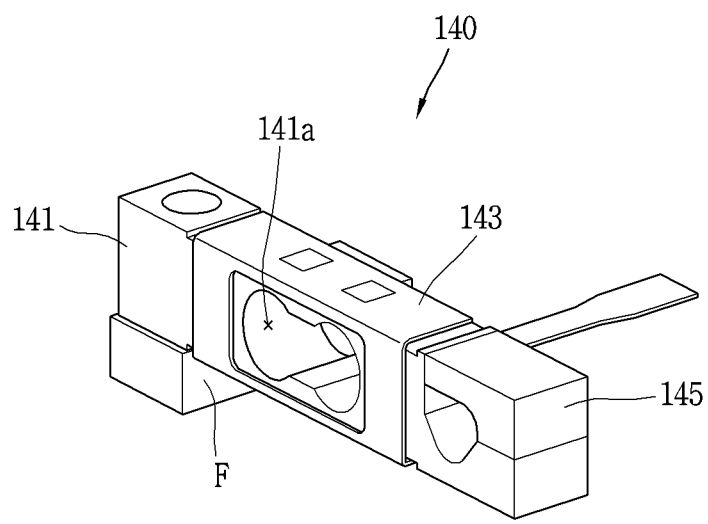
FIG. 2B is a perspective view illustrating an assembled state of the load sensing part illustrated in FIG. 2A.
Figure 3:
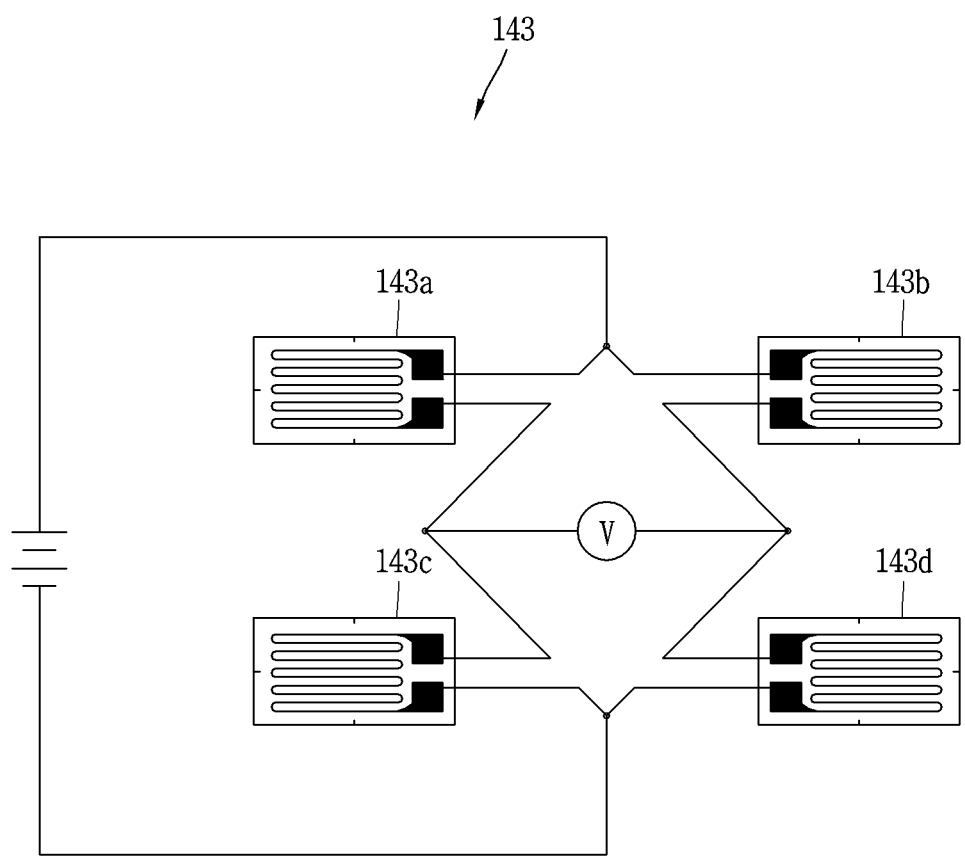
FIG. 3 is a conceptual view illustrating a circuit configuration of the sensor film part illustrated in FIG. 2A.

FIG. 2A is a perspective view illustrating a disassembled state of the load sensing part 140 illustrated in FIG. 1A, FIG. 2B is a perspective view illustrating an assembled state of the load sensing part 140 illustrated in FIG. 2A, and FIG. 3 is a conceptual view illustrating a circuit configuration of the sensor film part 143 illustrated in FIG. 2A.

Referring to FIGS. 2A to 3, the load sensing part 140 may include a sensor body 141, a sensor film part 143, and a cover 145.

The sensor body 141 may be formed to fix the sensor film part 143 coupled to the guide rail part 130 and sensing a magnitude of the load transferred through the guide rail part 130. In addition, the sensor body 141 may have a through hole 141a for causing strain when a load is applied to the touch screen. Although not illustrated in the figure, the sensor body 141 may be formed without a through-hole 141a and may be formed as a sheet having a small thickness t.

The sensor film part 143 may be formed in the form of a flexible printed circuit board (FPCB). As illustrated in the figure, in the sensor film part 143, first to fourth patterns 143a, 143b, 143c, and 143d for performing a strain gauge function may be disposed in upper and lower regions by twos, respectively. The circuit having such a structure is formed of a full bridge so that even when a temperature of any one of the first to fourth patterns 143a, 143b, 143c, and 143d is changed to change resistance, the change in resistance can be automatically cancel out. As a result, the pressure-sensitive haptic device 110 of the present invention may be configured to stably sense a magnitude of a load even in the environment where the temperature is changed.

The cover 145 may be coupled to the sensor body 141 in a state where the guide rail part 130 is seated on the sensor body 141 so as to fix the guide rail part 130 coupled to the sensor body 141.

Meanwhile, the sensor body 141 of the load sensing part 140 may be fixedly coupled with a fixing part F. The fixing part F may be, for example, a car body of a vehicle.

Hereinafter, the spring part 150 provided in the pressure-sensitive haptic device 100 will be described with reference to FIGS. 4 to 6.

Figure 4:
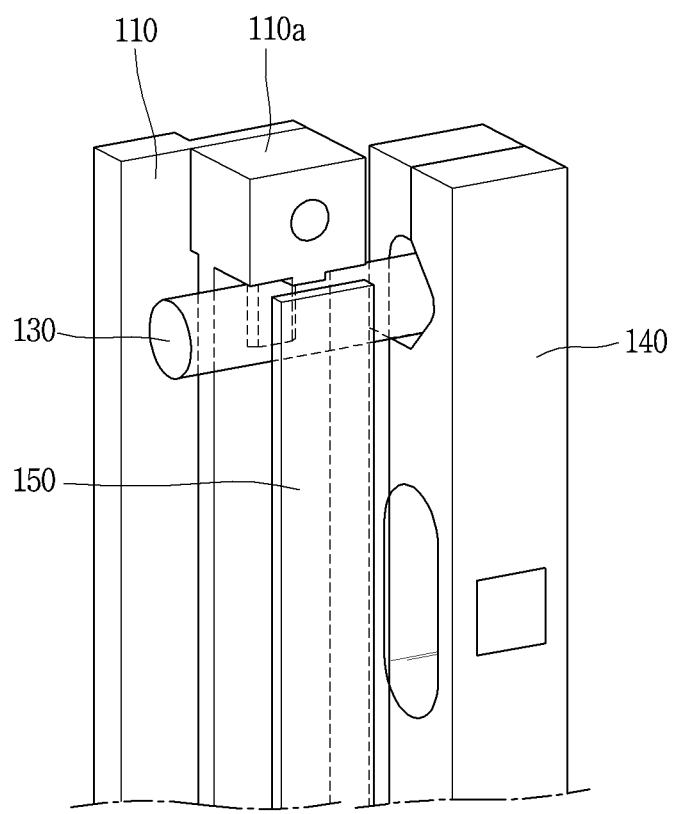
FIG. 4 is a rear perspective view of one edge region of the pressure-sensitive haptic device illustrated in FIG. 1B.
Figure 5:
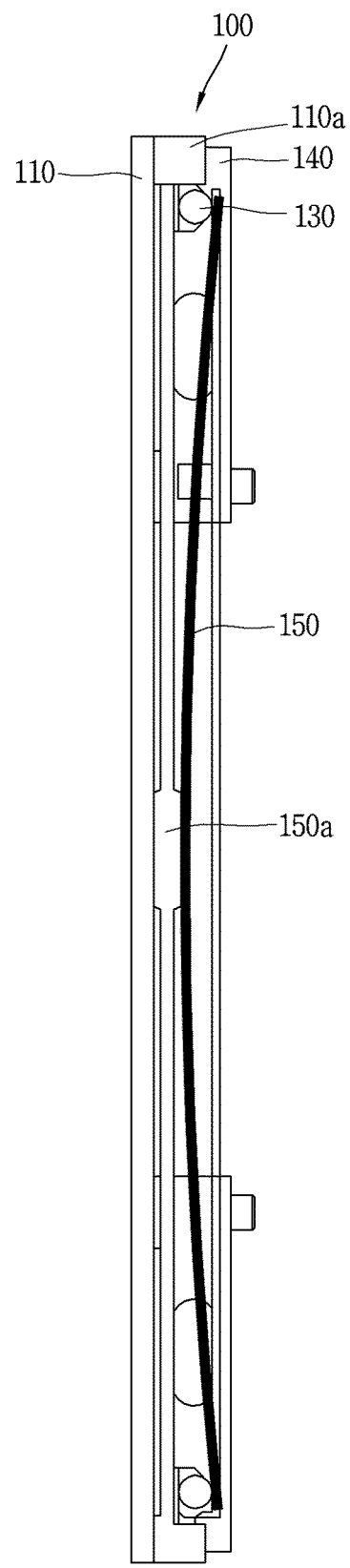
FIG. 5 is a cross-sectional view of the pressure-sensitive haptic device illustrated in FIG. 1B, taken along line A-A.
Figure 6:
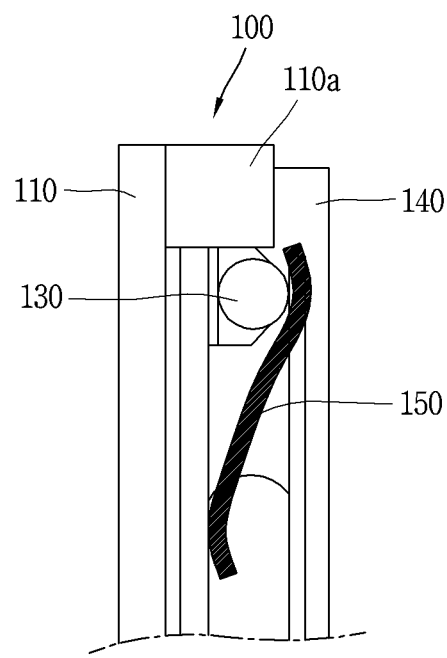
FIG. 6 is a cross-sectional view illustrating another example of the spring part illustrated in FIG. 5.

FIG. 4 is a rear perspective view of an edge region of the pressure-sensitive haptic device 100 illustrated in FIG. 1B, FIG. 5 is a cross-sectional view of the pressure-sensitive haptic device 100 illustrated in FIG. 1B, taken along line A-A, and FIG. 6 is a cross-sectional view illustrating another example of the spring part 150 illustrated in FIG. 5.

Referring to FIGS. 4 to 6, the pressure-sensitive haptic device 100 may further include the spring part 150.

The spring part 150 prevents a gap from being generated between the support plate 110 and the guide rail part 130 arranged to be in contact with the other surface of the support plate 110. When a gap is generated between the support plate 110 and the guide rail part 130, the load sensing part 140 cannot accurately measure a load value, or when there is no load transmitted through the guide rail part 130, the load value may be processed as '0'. The support plate 110 may include a fixing member 110a formed to fix movement of the guide rail part 130.

The spring part 150 provides an elastic force toward the support plate 110 and presses the guide rail part 130 to keep the load sensing part 140 in close contact with the support plate 110.

For example, as illustrated in FIG. 5, the spring part 150 is fastened to the support plate 110 by a bolt fixing part 150a formed at the center by using a long leaf spring so as to press both the guide rails 140 disposed above and below, as a single spring member.

In turn, as illustrated in FIG. 6, the spring part 150 may be a spring formed as a short spring rather than a long leaf spring, and may be formed to press the guide rails 140 disposed above and below.

In the pressure-sensitive haptic device 100 of the present invention, since the tightly attached state of the support plate 110 and the guide rail part 130 is stably maintained by the spring part 150, measurement reliability of the load sensing part 140 disposed at both ends of the guide rail part 130 may be further improved.

Hereinafter, a fastening structure of the support plate 110 and the actuator 120 according to the present invention will be described in detail with reference to FIGS. 7 and 8.

Figure 7:
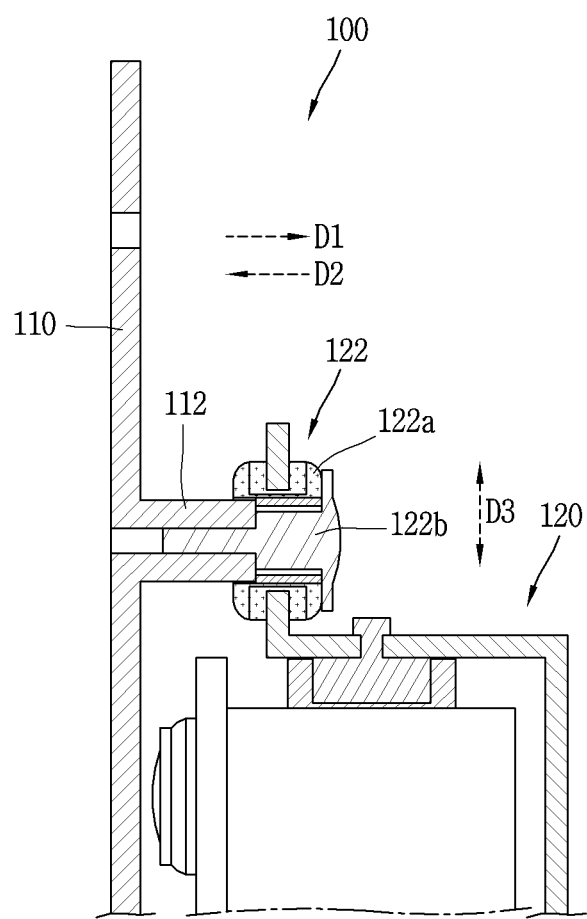
FIG. 7 is a cross-sectional view of the pressure-sensitive haptic device illustrated in FIG. 1B, taken along line B-B.
Figure 8:
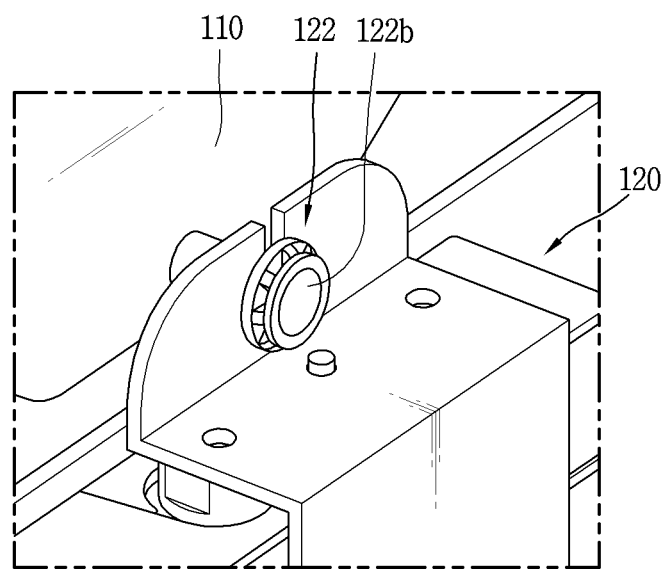
FIG. 8 is a perspective view illustrating a region where a support plate and an actuator illustrated in FIG. 7 are coupled.

FIG. 7 is a cross-sectional view of the pressure-sensitive haptic device 100 illustrated in FIG. 1B, taken along line B-B, and FIG. 8 is a perspective view illustrating a region where the support plate 110 and the actuator 120 illustrated in FIG. 7 are coupled.

Referring to FIGS. 7 and 8, the support plate 110 includes a protrusion 112 protruding toward the actuator 120, and the actuator 120 may have a fastening part 122 coupled to the protrusion formed in the support plate 110 so that a reaction force against a load applied to the touch screen is not generated in the coupling portion with the support plate 110.

Here, the fastening part 122 may include a damper part 122a and a head part 122b.

The damper part 122a may be formed to be slidable in a state in which at least a portion of the protrusion 112 is inserted as illustrated, when a load is generated on the touch screen disposed on one surface of the support plate 110.

The head part 122b has one end coupled to the protrusion 112 and the other end whose at least portion is caught by the damper part 122a in order to prevent movement or separation of the support plate 122 by an external force generated in a direction D2 opposite to the direction D1 of the load generated on the touch screen.

According to the above-described coupling structure of the support plate 110 and the actuator 120, when a load is generated on the touch screen, the support plate 110 slides in the direction D1 in which the load is generated to minimize a reaction force generated in the coupling region of the support plate 110 and the actuator 120, whereby an unnecessary factor that affects the load value measured by the load sensing part 140 may be removed. In addition, movement or separation of the support plate 110 in the direction D2 opposite to the load is prevented and vibration generated in a horizontal direction D3 of the actuator 120 may be transmitted to the support plate 110 by the damper part 122a. For example, the damper part 122a is made of an elastic material such as rubber to fix the protrusion 112 before the vibration is generated and may generate vibration in the horizontal direction D3 when vibration is generated.

Hereinafter, an example in which vibration is generated in the actuator 120 according to a change in load applied to the touch screen T will be described with reference to FIG. 9.

Figure 9:
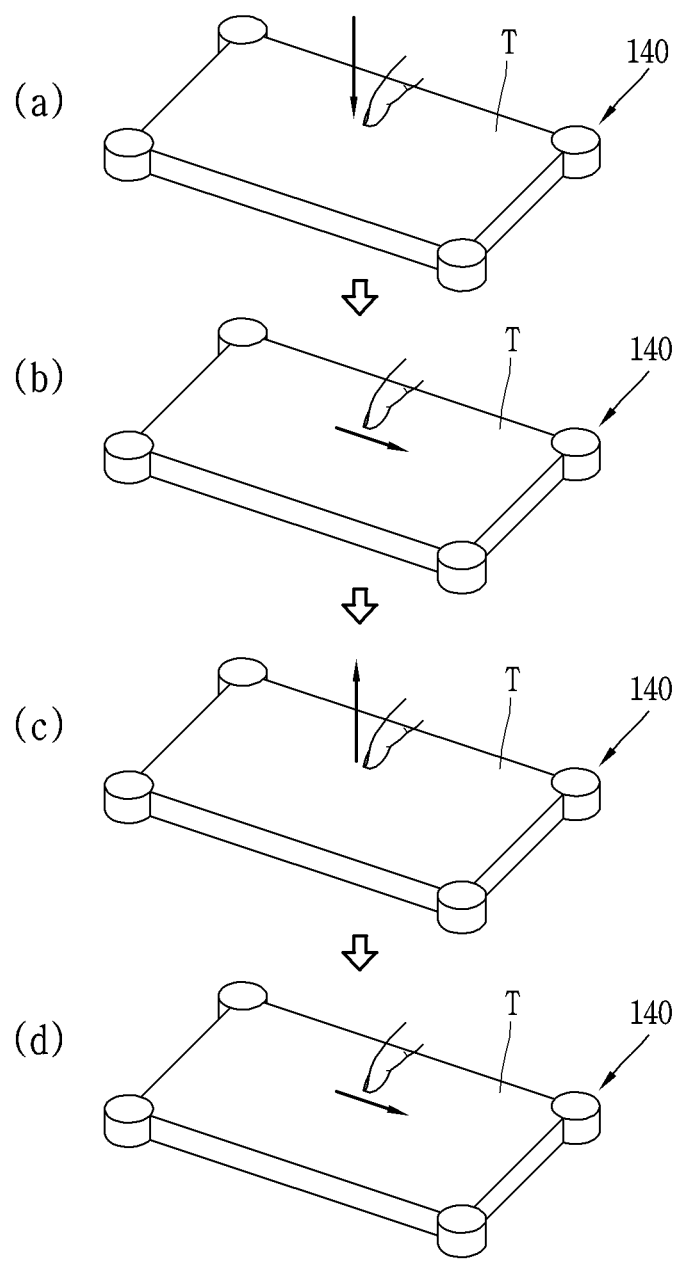
FIG. 9 is a conceptual view illustrating an example in which vibration is generated in an actuator according to a change in load applied to a touch screen of the present invention.

FIG. 9 is a conceptual view illustrating an example in which vibration is generated in the actuator 120 according to a change in load applied to a touch screen T of the present invention.

Referring to (a) of FIG. 9, when a load is applied to the touch screen T by a finger of the user, if a load value measured through the load sensing part 140 is greater than a first reference value (threshold 1), first vibration is generated in the actuator 120 as illustrated in (b) of FIG. 9. Next, after the first vibration is generated, when the user moves to reduce a magnitude of the load by the user's finger, that is, when the user separates the finger from the touch screen T as illustrated in (c) of FIG. 9 so the load is smaller than a second reference value (threshold), second generation may be generated in the actuator 120 as illustrated in (c) OF FIG. 9. Accordingly, the pressure-sensitive haptic device 100 of the present invention more advantageously provides the effect of physical buttons to the user.

In addition, although not illustrated in the figure, in order to constantly maintain vibration transmitted to the user by complementing a phenomenon in which vibration characteristics and the elastic modulus of the system are changed according to the magnitude of the load applied to the touch screen T, vibration of the actuator 120 may be provided to be different depending on a magnitude of a load applied to the touch screen T. Also, in the pressure-sensitive haptic device 100 according to the present invention, when a touch input applied to the touch screen T is a drag type, a magnitude of vibration of the actuator 120 is provided to be different depending on a situation in which a direction of the drag input is the same as or different from a vibration direction of the actuator 120, whereby vibration of a regular magnitude may be transmitted to the user.

Hereinafter, a controller (not shown) included in the pressure-sensitive haptic device 100 will be described with reference to FIGS. 10A and 10B.

Figure 10A:
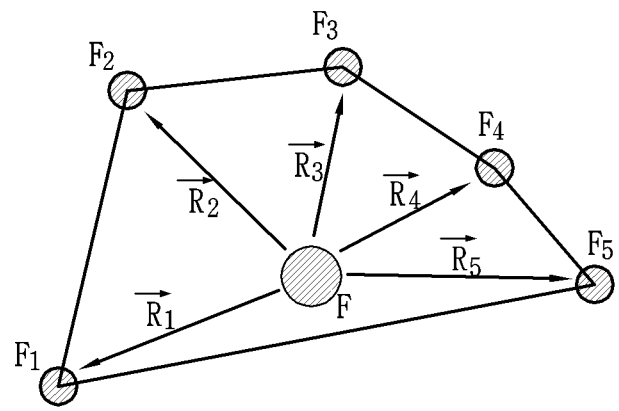
FIGS. 10A and 10B are conceptual views illustrating a controller for calculating a magnitude of each load acting by positions where a load is generated in the touch screen illustrated in FIG. 9.
Figure 10B:
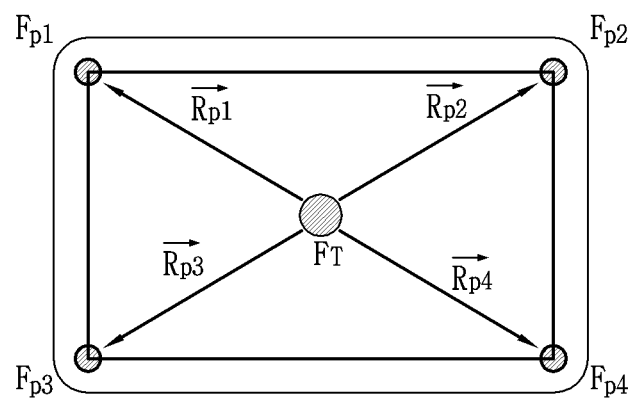

FIGS. 10A and 10B are conceptual views illustrating a controller (not shown) for calculating a magnitude of each load acting by positions where a load is generated in the touch screen T illustrated in FIG. 9.

Referring to FIGS. 10A and 10B, the pressure-sensitive haptic device 100 may further include a controller (not shown).

First, as illustrated in FIG. 10B, the controller calculates a center position of the load and a total load value of the load by using load magnitudes FP1, FP2, FP3, and FP4 measured by the load sensing part 140. Here, the center position of the load and the total load value FT of the load may be calculated by an equation that an addition of the sum of the load values measured by each load sensing part 140, distances RP1, RP2, RP3, and RP4 from a position of the total load value FT to each load sensing part 140, and the product of each load value is '0'. Also, as illustrated in FIG. 10A, the controller may calculate a magnitude of each load acting on generation positions F1, F2, F3, and F4 of the loads. The magnitude of the load acting on the generation positions of the load may be calculated by using an equation that the sum of the load values at the load generation positions F1, F2, F3, and F4 is equal to the total load value FT and the sum of products of the distances R1, R2, R3, and R4 from the center position of the load to the load generation positions F1, F2, F3, and F4 is '0'.

Hereinafter, examples of the visual information output through the touch screen T illustrated in FIG. 9 will be described with reference to FIGS. 11A to 11C.

Figure 11A:
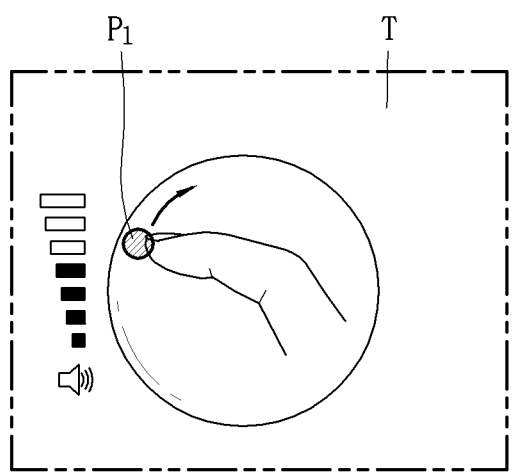
FIGS. 11A to 11C are conceptual views illustrating examples of visual information output from the touch screen illustrated in FIG. 9.
Figure 11B:
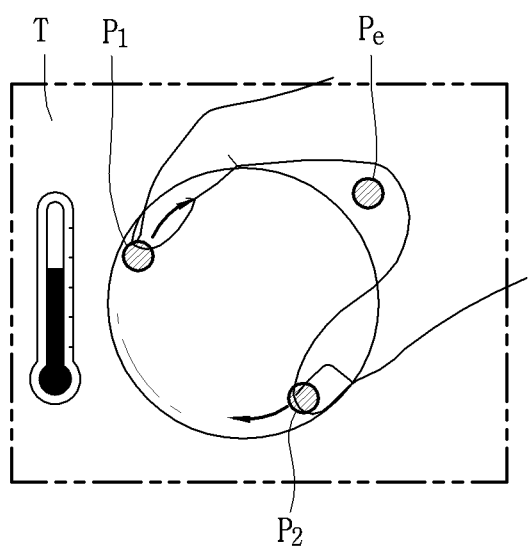
Figure 11C:
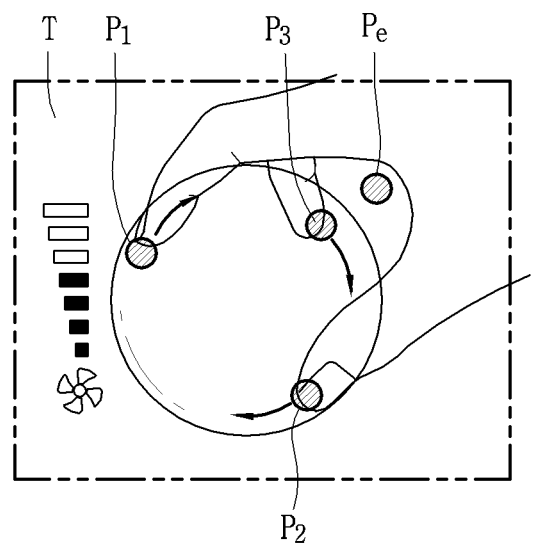

FIGS. 11A to 11C are conceptual views illustrating examples of visual information output from the touch screen T illustrated in FIG. 9.

First, referring to FIG. 11A, when a single touch point P1 is operated, a first operation, for example, a volume adjustment function, may be performed. At this time, touch information input through the touch screen T is reflected only when a load equal to or greater than a predetermine size is applied.

Next, referring to FIG. 11B, when two touch points P1 and P2 are operated simultaneously, a second operation, for example, a temperature adjustment function, may be performed. Finally, referring to FIG. 11C, when three touch points P1, P2, and P3 are simultaneously operated, a third operation, for example, an air volume adjustment function, may be performed.

Here, the pressure-sensitive haptic device 100 of the present invention is configured such that touch input information is reflected only when a load is equal to or greater than a specific magnitude although an unintentional touch point Pe is generated when two or more touch points are simultaneously operated, and since a load value of each of the touch points P1, P2, and P3 is calculated, whether the unintentional touch point Pe is valid input information or not may be relatively accurately determined.

Hereinafter, a pressure-sensitive haptic device 200 according to another embodiment of the present invention will be described with reference to FIGS. 12A and 12B.

Figure 12A:
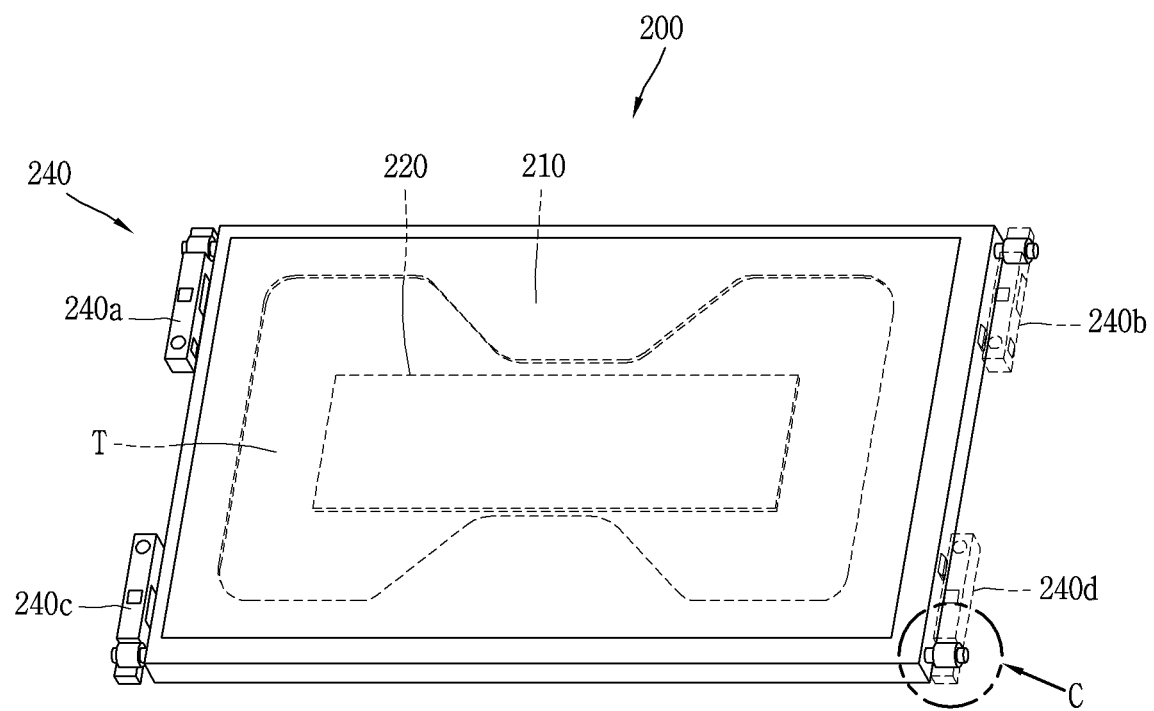
FIG. 12A is a perspective view illustrating a pressure-sensitive haptic device according to another embodiment of the present invention.
Figure 12B:
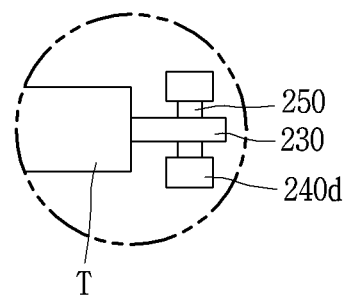
FIG. 12B is an enlarged view of a cross-section of a portion C illustrated in FIG. 12A.

FIG. 12A is a perspective view illustrating a pressure-sensitive haptic device 200 according to another embodiment of the present invention, and FIG. 12B is an enlarged view of a cross-section of a portion C illustrated in FIG. 12A.

Referring to FIGS. 12A and 12B, the pressure-sensitive haptic device 200 includes a support plate 210, an actuator 220, a guide part 230, and a load sensing part 240.

Here, the support plate 210, the touch screen T mounted on the support plate 210, and the actuator 120 may have similar configuration and effective features as those of the touch screen.

The support plate 210 is formed to be fixed in a state that the touch screen T is mounted on one surface of the support plate 210.

The actuator 220 is engaged with at least a portion of the support plate 210 to generate vibration in response to a load applied to the touch screen T.

The guide part 230 may protrude from a side surface of the touch screen T as illustrated. That is, the guide part 230 may be formed integrally with a body of the touch screen T. A plurality of guide parts 230 may be provided as illustrated, and when the touch screen T is deformed due to a load applied on the touch screen T, the guide part 230 may be deformed together with the touch screen T.

The load sensing part 240 is coupled to an end of the guide part 230 and is configured to support the end of the guide part 230 protruding from a side surface of the touch screen T as illustrated to receive a load applied to the touch screen T through the guide part 230 to sense a magnitude of the load. In addition, as illustrated, the load sensing part 240 may include first to fourth load sensors 240a, 240b, 240c, and 240d coupled to ends of the guide parts 140, respectively.

In the meantime, the pressure-sensitive haptic device 200 may further include a bearing part 250.

The bearing part 250 is formed to surround the guide part 230 protruding from the side surface of the touch screen T and is disposed between the guide part 230 and the load sensing part 240 to support the guide part 230. By the structure of the bearing part 250, deformation due to rotation or linear movement generated in the guide part 230 when the touch screen T is pressed may be stably supported.

Hereinafter, a pressure-sensitive haptic device 300 according to another embodiment of the present invention will be described with reference to FIG. 13.

Figure 13:
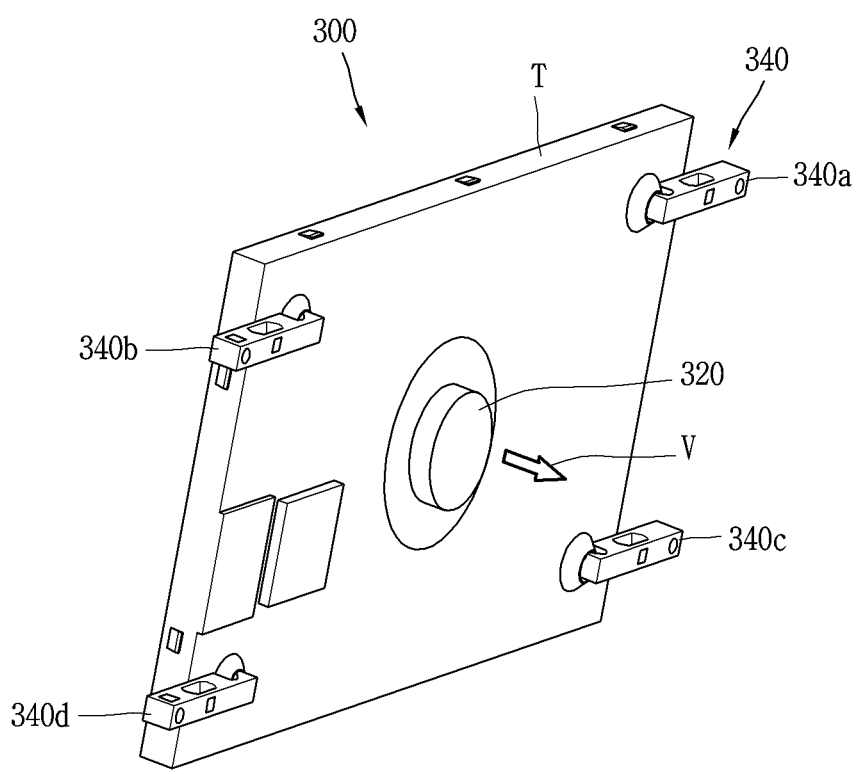
FIG. 13 is a perspective view illustrating a pressure-sensitive haptic device according to another embodiment of the present invention.

FIG. 13 is a perspective view illustrating a pressure-sensitive haptic device 300 according to another embodiment of the present invention.

Referring to FIG. 13, the pressure-sensitive haptic device 300 may include a touch screen T and a load sensing part 340.

The touch screen T may include a front panel and a rear panel, and may include a touch panel for sensing a touch input of the user. Here, the screen information displayed to the user through the touch screen T may be output to the front surface. The touch input may receive information through the user's finger, a touch pen, or the like.

The load sensing part 340 may be coupled to the rear surface to detect a magnitude of a load applied to the touch screen T. According to the present invention having such a configuration, the size of the pressure-sensitive haptic device 300 may be reduced, while a haptic effect corresponding to a touch input of the user is not provided. Also, as illustrated, the load sensing part 340 may include first to fourth load sensors 340a, 340b, 340c, and 340d, disposed in regions of the rear surface.

Meanwhile, the pressure-sensitive haptic device 300 may further include an actuator 320.

The actuator 320 is coupled to the rear surface of the touch screen T. When a load is applied to the touch screen T, the actuator 320 receives a signal generated in the load sensing part 340 and transmits the vibration to the touch screen T. In addition, the actuator 320 may be configured to generate vibration in a direction V perpendicular to the front and rear surfaces of the touch screen T.

Hereinafter, a controller (not shown) for processing each function according to a load applied to the touch screen T in the pressure-sensitive haptic device 100, 200, or 300 according to the present invention will be described with reference to FIGS. 14A to 14C.

Figure 14A:
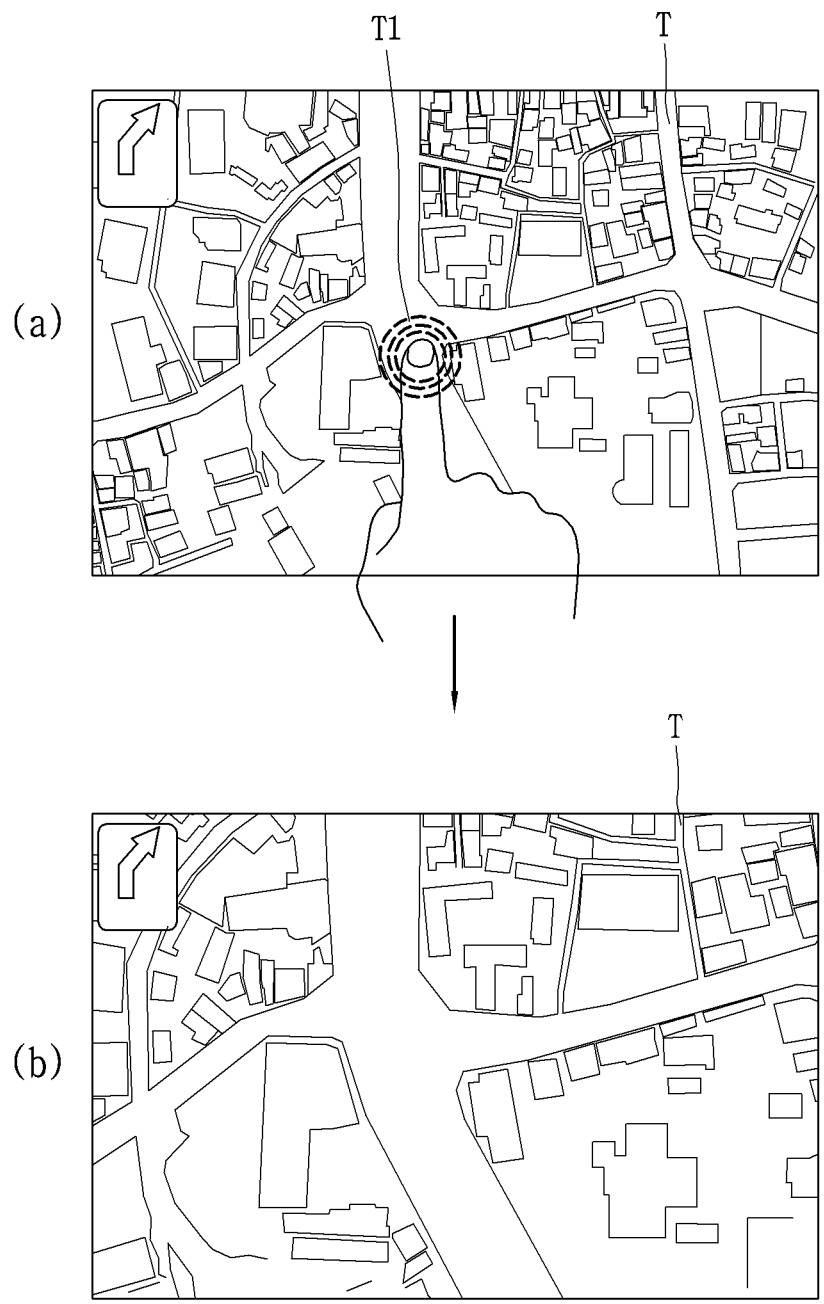
FIGS. 14A, 14B, and 14C are conceptual views illustrating a controller for processing a function according to a load applied to a touch screen in a pressure-sensitive haptic device according to the present invention.
Figure 14B:
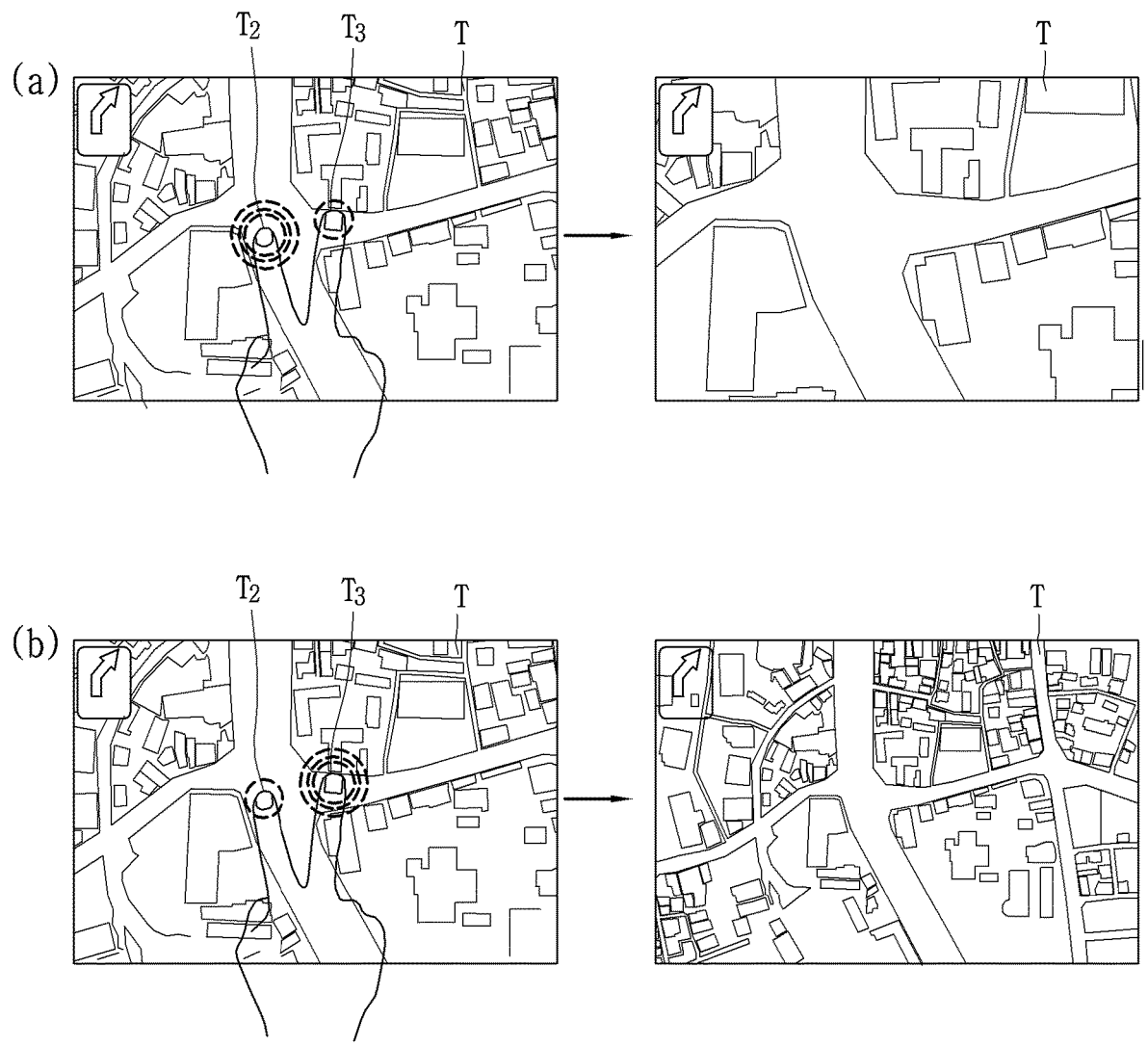
Figure 14C:

FIGS. 14A, 14B, and 14C are conceptual views illustrating a controller for processing a function according to a load applied to the touch screen T in the pressure-sensitive haptic device 100, 200, or 300 according to the present invention.

Referring to FIGS. 14A to 14C, the pressure-sensitive haptic device 100, 200, or 300 may further include a controller (not shown).

The controller processes each function corresponding to a load applied to the touch screen T by using a signal generated in the load sensing part 140, 240 or 340 when the touch screen T is pressed.

More specifically, when a load is applied to the first region T1 on the touch screen T as illustrated in (a) of FIG. 14A, the controller may process a first function corresponding to a magnitude of the load. Here, the first function may be a function of enlarging or reducing a size of screen information output on the touch screen T as illustrated in (b) of FIG. 14A. Accordingly, the function of adjusting the size of the screen information of the touch screen T may be easily implemented through a single user motion.

Meanwhile, as illustrated in FIG. 14B, the controller may process a second function corresponding to a magnitude of a load applied to first and second regions T2 and T3 of the touch screen T.

Specifically, as illustrated in (a) and (b) of FIG. 14B, in a state that the user's touch input is applied to the first region T2 and the second region T3 different from the first region T2 on the touch screen T, the second function may be performed to correspond to a magnitude of a load applied to the first and second regions T2 and T3. Here, the second function may be configured to enlarge or reduce a size of screen information output to the touch screen T according to a difference in load applied to the first and second regions T2 and T3.

For example, the second function is configured to enlarge a size of screen information output on the touch screen T when a load applied to the first region T2 is greater than the second region T3 as illustrated in (a) of FIG. 14B, and configured to reduce a size of screen information output on the touch screen T when a load applied to the second region T3 is greater than the first region T2 as illustrated in (b) of FIG. 14B. Thus, in a state in which a plurality of touch inputs are applied to the touch screen T, a size of screen information output on the touch screen T may be easily adjusted even without a drag motion such as pinch-in or pinch-out.

Meanwhile, the controller may process a third function corresponding to a magnitude of a load applied to the first region T4 of the touch screen T as illustrated in FIG. 14C.

More specifically, when a load is applied to the first region T4 of the touch screen T as illustrated in (a) of FIG. 14C, the third function may be processed in accordance with a magnitude of the load. Here, the third function may be configured to output additional information provided based on screen information displayed on the touch screen T.

For example, the second function may be configured to indicate locations of restaurants J1 on screen information displayed on the touch screen T as illustrated in (b) of FIG. 14C when a high pressure is applied to the touch screen T, indicate locations of gas stations J2 on the screen information displayed on the touch screen T as illustrated in (b) of FIG. 14C when a mid-sized pressure is applied to the touch screen T, and indicate locations of favorite destinations J3 of the user as illustrated in (d) of FIG. 14C when a relatively low pressure is applied to the touch screen T.

A controller (not shown) for processing a function corresponding to a magnitude of a load applied to graphical objects W and O output on the touch screen (T) of the pressure-sensitive haptic device 100, 200, or 300 will be described with reference to FIGS. 15A and 15B.

Figure 15A:
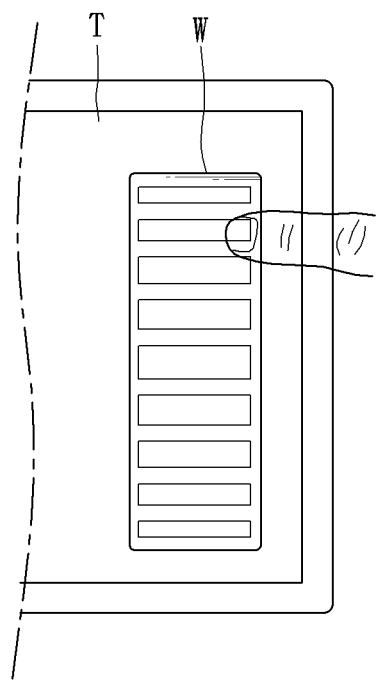
FIGS. 15A and 15B are conceptual views illustrating a controller for processing a function corresponding to a load applied to a graphic object output to a touch screen of a pressure-sensitive haptic device according to the present invention.
Figure 15A:
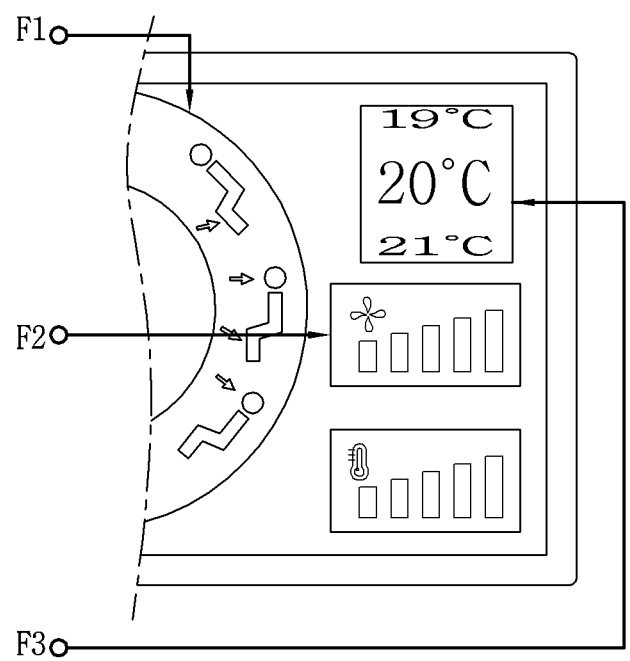
Figure 15B:
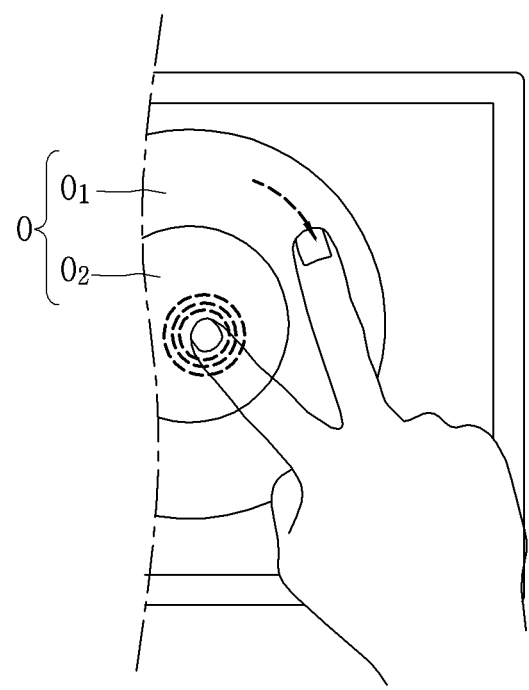

FIGS. 15A and 15B are conceptual views illustrating a controller for processing a function corresponding to a load applied to graphic objects W and O output to a touch screen of a pressure-sensitive haptic device 100, 200, or 300 according to the present invention.

Referring to FIGS. 15A and 15B, the touch screen T provided in the pressure-sensitive haptic device 100, 200, or 300 is configured to output graphic objects W and O to which touch input information is applied from the user, and the controller may process a fourth function corresponding to a magnitude of the load applied to the graphical object W and O.

More specifically, referring to FIG. 15A, a graphic object W output on a touch screen T is formed as a wheel key of a mouse, which is one of input devices, and the fourth function may be configured to perform each control function corresponding to a magnitude of the load applied to the wheel key. For example, the fourth function may be configured to adjust a wind direction of an air conditioning system provided in a vehicle, or the like, when a high load is applied to the wheel key, configured to adjust an air volume of the air conditioning system when a load of a medium size is applied to the wheel key, and configured to adjust a temperature magnitude of the air conditioning system when a load having a relatively low magnitude is applied to the wheel key. Although not illustrated in the figure, the fourth function may be a function of selecting a value of a volume and a frequency of a radio device provided in a vehicle, or the like, AM broadcast, FM broadcast, etc. according to the magnitude of the load applied to the wheel key.

Then, referring to FIG. 15B, the graphic object O may include a first portion O1 and a second portion O2 different from the first portion O1. Here, the fourth function is a function of selecting a specific control function by a user's touch input applied to the first portion O1 and selecting a control value of the specific function selected by the user's touch input applied to the first portion O1 using touch input information of the user applied to the second portion O2. Accordingly, since there is no need to apply an additional load to the second portion O2 to select the control value of the specific function selected by the touch input to the first portion O1, the control value of the specific function may be easily selected, without increasing a frictional force in the second portion O2.

Hereinafter, a controller (not shown) performing a function corresponding to a change in condition when the pressure-sensitive haptic device 100, 200, or 300 according to the present invention is mounted in a moving unit M will be described with reference to FIGS. 16A and 16B.

Figure 16A:
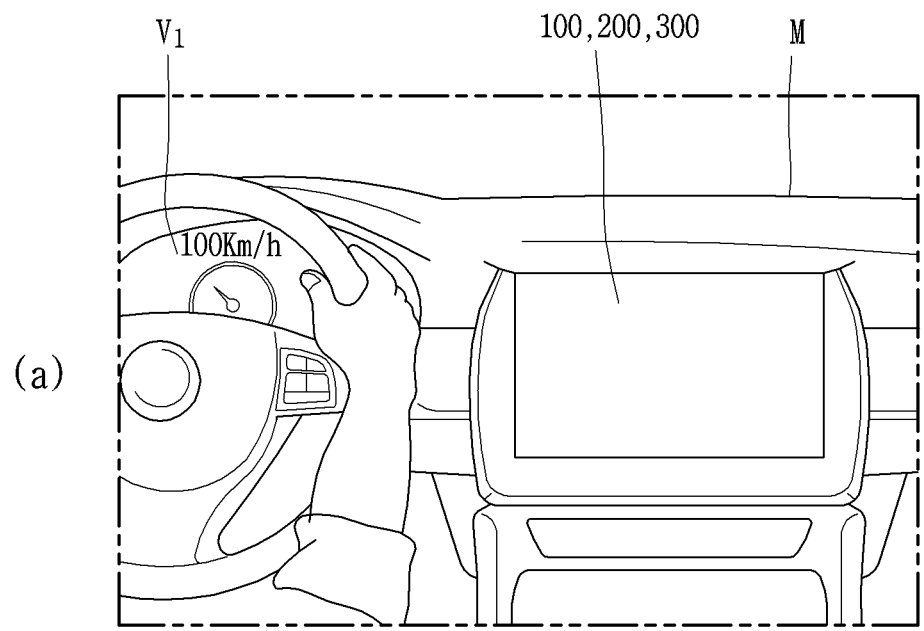
FIGS. 16A and 16B are conceptual views illustrating a controller for performing a function corresponding to a condition according to a moving unit when the pressure-sensitive haptic device according to the present invention is mounted on the moving unit.
Figure 16A:
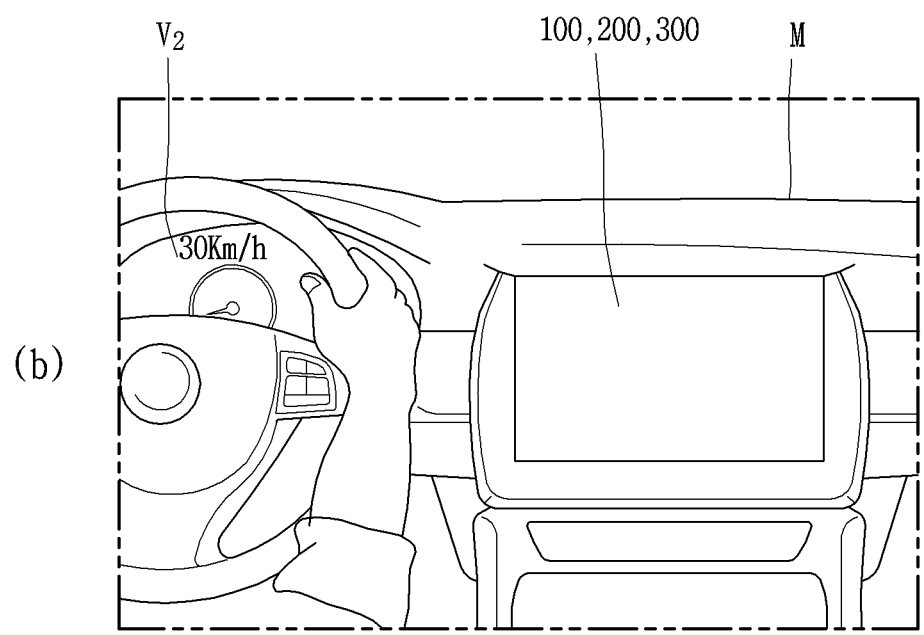
Figure 16B:
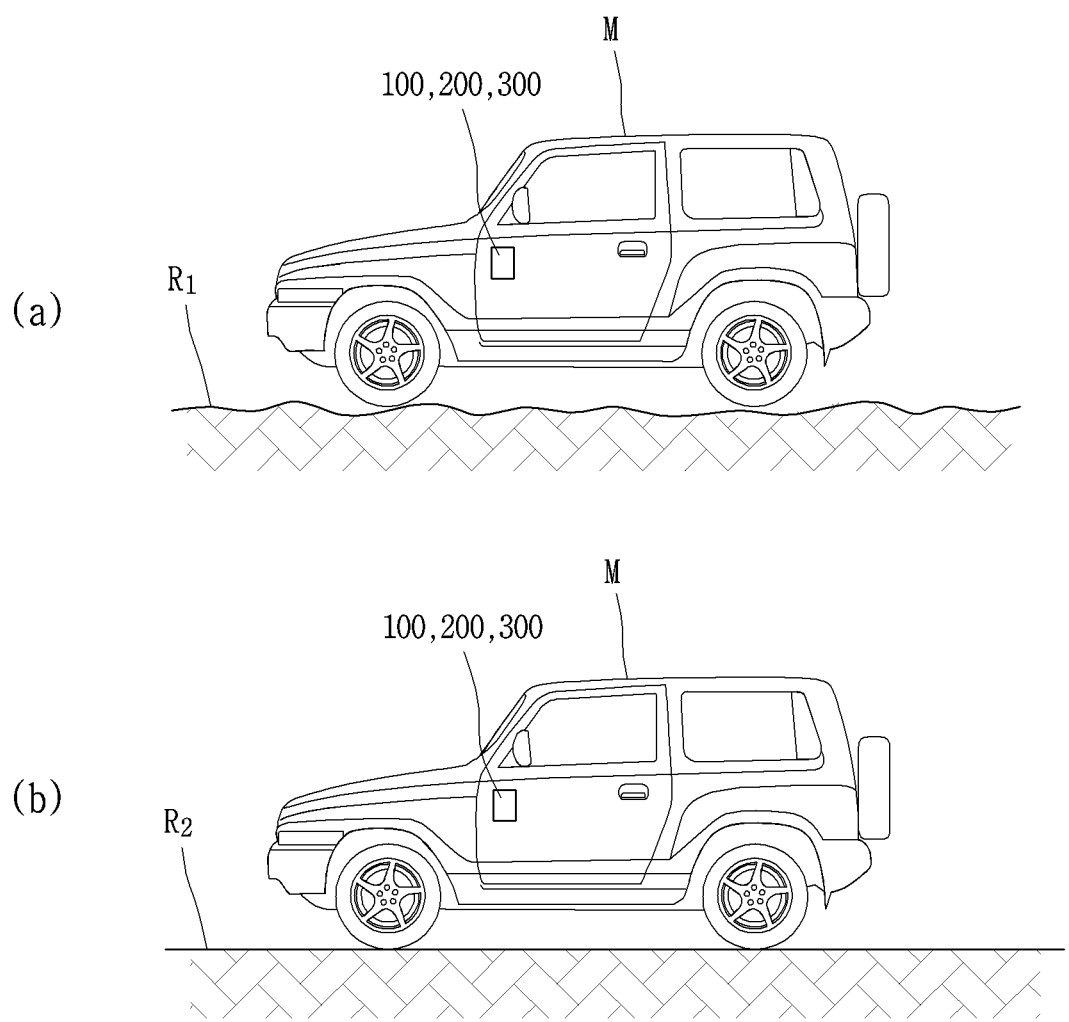

FIGS. 16A and 16B are conceptual views illustrating a controller which performs a function corresponding to a condition according to the moving unit M when the pressure-sensitive haptic device 100, 200, or 300 is mounted in the moving unit.

Referring to FIGS. 16A and 16B, the pressure-sensitive haptic device 100, 200, or 300 may further include a controller (not shown) mounted in the moving unit M which is movable and processing each function according to a load applied to the touch screen T by using a signal generated in the load sensing part 140, 240, or 340. The moving unit may be any one of a vehicle and a ship.

Here, referring to FIG. 16A, the controller may control the actuators 120, 220, and 320 so as to generate vibrations of different magnitudes according to the velocity of the moving unit M that generates vibration in the pressure-sensitive haptic device 100, 200 or 300. For example, when the speed of the moving unit M is a first speed V1 as illustrated in (a) of FIG. 16A, the controller may control the actuator 120, 220 or 320 to generate first vibration having a preset size, and when the speed of the moving unit M is a second speed V2 lower than the first speed V1 as illustrated in (b) of FIG. 16A, the controller may control the actuator 120, 220, or 320 to generate second vibration having a size smaller than that of the first vibration.

Also, when a speed of the moving unit M is the first speed V1, the controller may increase sensitivity of a load sensed by the load sensing part 140, 240 or 340, and when a speed of the load sensing part 140 is the second speed V2 lower than the first speed V1, the controller may decrease sensitivity of a load sensed by the load sensing part 140, 240 or 340.

Meanwhile, referring to FIG. 16B, the controller may control a magnitude of vibration generated in the actuator 120, 220, or 320 according to a route state of the moving unit M that causes vibration in the pressure-sensitive haptic device 100, 200 or 300. For example, when a route state of the moving unit M is a rough road surface R1 as illustrated in (a) of FIG. 16B, the controller may increase a magnitude of vibration generated in the actuator 120, 220 or 320 and transmit the vibration to the user, and when a route state of the moving unit M is a flat road surface R2 as illustrated in (b) of FIG. 16B, the controller may relatively decrease a magnitude of vibration generated in the actuator 120, 220, or 320 to uniformly maintain a haptic effect actually felt by the user.

Hereinafter, a controller (not shown) for performing a control function corresponding to each hand of the user used as a touch input means in the pressure-sensitive haptic device 100, 200, or 300 according to the present invention will be described with reference to FIG. 17.

Figure 17:
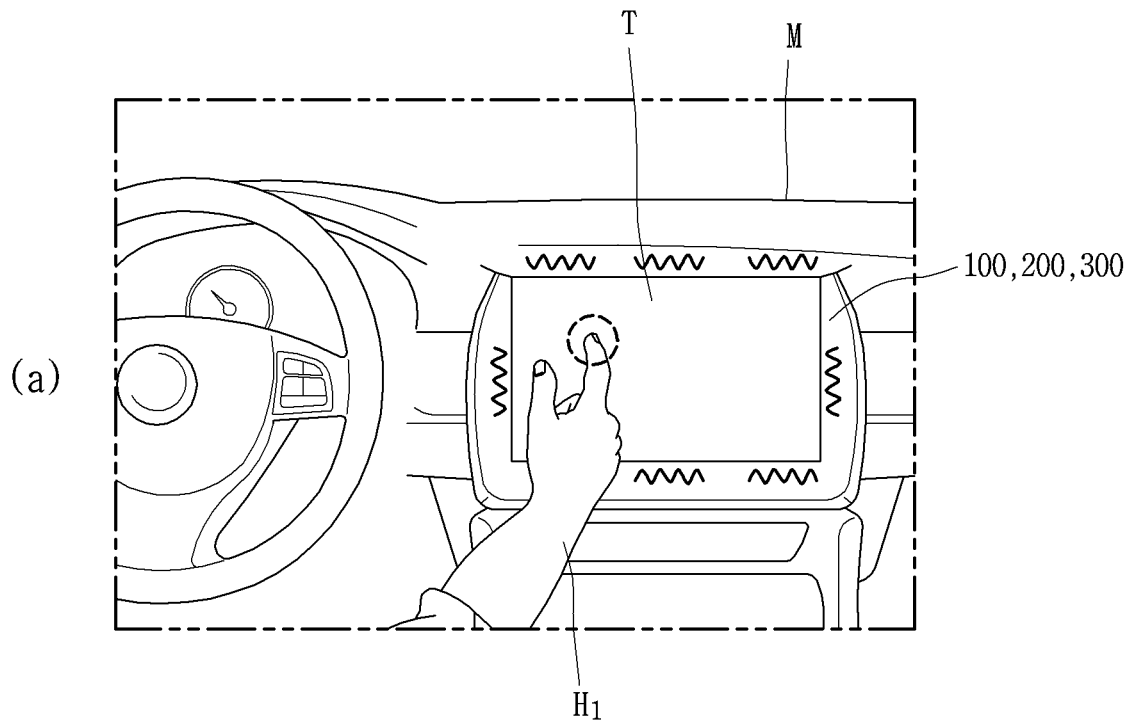
FIG. 17 is a conceptual view illustrating a controller for performing a control function corresponding to each hand of a user used as means of a touch input in a pressure-sensitive haptic device according to the present invention.
Figure 17:
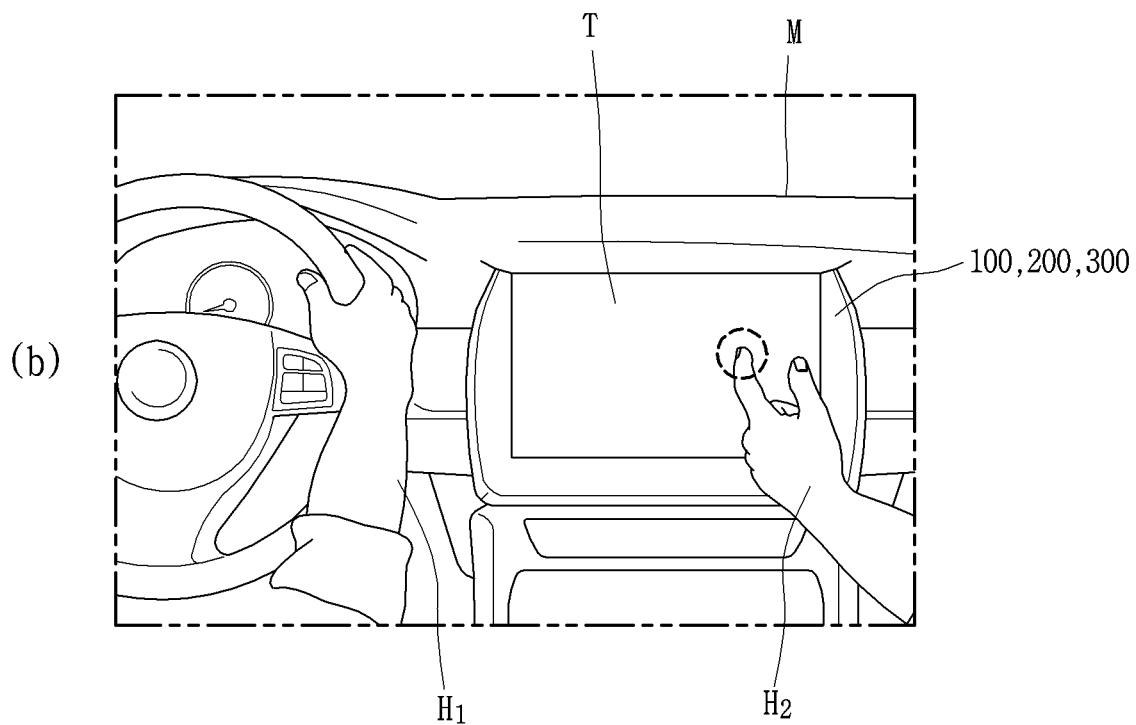

FIG. 17 is a conceptual view illustrating a controller which performs control functions corresponding to the user's both hands used as a touch input means in the pressure-sensitive haptic device 100, 200, or 300 according to the present invention.

Referring to FIG. 17, the pressure-sensitive haptic device 100, 200, or 300 may further include a controller (not shown) configured to process each function corresponding to a load applied to the touch screen T using a signal generated in the load sensing part 140, 240, or 340.

The controller is configured to determine one of the user's both hands based on a fingerprint form of the user applied to the touch screen. Here, when a touch input is applied to the touch screen T through any one hand of the user, the controller may maintain the vibration generated by the actuator 120, 220 or 320, and when a touch input is applied to the touch screen T through the other hand, the controller may stop the vibration generated in the actuator 120, 220, or 320.

For example, in a state in which the pressure-sensitive haptic device 100, 200, or 300 is mounted in the moving unit M which is formed to be movable, when a touch input is applied to the touch screen T through the right hand H1 of the user located in the driver's seat as illustrated in (a) of FIG. 17, the vibration effect generated in the actuator 120, 220 or 320 is maintained, and when a touch input is applied to the touch screen T through the left hand H2 of the user located in the passenger seat as illustrated in (b) of FIG. 17, the vibration effect generated in the actuator 120, 220, or 320 may be stopped. Accordingly, the haptic effect may be selectively provided according to a demand level of a haptic effect depending on the user.

It should be appreciated that the scope of the present invention is not limited to the configurations and the methods of the embodiments described above, and the embodiments may be entirely or partially selectively combined to be configured to make various modifications. In addition, it should be apparent to those skilled in the art that the following description of various embodiments of the present disclosure is provided for illustration purpose only and not for the purpose of limiting the present disclosure as defined by the appended claims and their equivalents.

Embodiments of the present invention may be applied to various related industrial fields by proposing the pressure-sensitive haptic device including a cantilever type load sensor so that an operation may be stably performed even in an environment in which vibration or temperature change occurs.

The invention claimed is:

1. A pressure-sensitive haptic device comprising:
   a support plate coupled in a state that a touch screen is mounted on one surface;
   an actuator coupled to the support plate, generating vibration in response to a load applied to the touch screen, and transmitting the vibration to the support plate;
   a guide rail part disposed to be in contact with the other surface of the support plate to support the support plate; and
   a load sensing part coupled to both ends of the guide rail part and sensing a magnitude of a load applied to the touch screen upon receiving the load through the guide rail part,
   wherein the support plate is coupled to the guide rail part and coupled to slidably move in one direction along the guide rail part, and the actuator generates vibration in a direction in which the support plate slidably moves.

2. The pressure-sensitive haptic device of claim 1, wherein the guide rail part includes first and second guide rails disposed to face each other based on the actuator, and the load sensing part is coupled to both ends of each of the first and second guide rails.

3. The pressure-sensitive haptic device of claim 1, wherein the support plate has a protrusion formed to protrude toward the actuator, and the actuator includes a fastening part coupled to the protrusion to prevent generation of a reaction force against a load applied to the touch screen in a portion where the support plate and the actuator are coupled, and the fastening part includes a damper part formed to slidably move in a state that at least a portion of the protrusion is inserted when a load is generated in the touch screen and a head part in which one end is coupled to the protrusion and at least a portion of the other end is caught by the damper part to limit movement based on an external force generated in a direction opposite to the load.

4. The pressure-sensitive haptic device of claim 1, further comprising:
   a bearing part formed to surround the guide rail part and disposed between the guide rail part and the load sensing part to support the guide rail part.

* * * * *